US007275092B2

(12) United States Patent
Copp

(10) Patent No.: US 7,275,092 B2
(45) Date of Patent: Sep. 25, 2007

(54) METHOD AND SYSTEM FOR CONTROLLING THE OPERATION OF A PERIPHERAL DEVICE IN A NETWORK

(75) Inventor: Larry A. Copp, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 629 days.

(21) Appl. No.: 10/012,508

(22) Filed: Dec. 12, 2001

(65) Prior Publication Data

US 2003/0110270 A1 Jun. 12, 2003

(51) Int. Cl.
*G06F 15/177* (2006.01)

(52) U.S. Cl. ...................................................... 709/221

(58) Field of Classification Search ................ 709/206, 709/220–222, 228; 710/8, 10, 15, 19; 717/171
See application file for complete search history.

(56) References Cited

U.S. PATENT DOCUMENTS 6,167,395 A * 12/2000 Beck et al. .................... 707/3
6,498,611 B1 * 12/2002 Beard et al. ................ 715/752
6,553,414 B1 * 4/2003 Kakimoto et al. .......... 709/220
6,584,499 B1 * 6/2003 Jantz et al. ................ 709/220
6,615,297 B1 * 9/2003 Beard et al. .................. 710/62
6,622,266 B1 * 9/2003 Goddard et al. .............. 714/44
6,779,004 B1 * 8/2004 Zintel ......................... 709/227
6,785,015 B1 * 8/2004 Smith et al. ............... 358/1.15
6,874,119 B2 * 3/2005 Macleod Beck et al. ........................ 715/500.1
6,901,439 B1 * 5/2005 Bonasia et al. ............. 709/220
6,904,457 B2 * 6/2005 Goodman ................... 709/221
6,907,414 B1 * 6/2005 Parnell ........................ 706/47
6,968,365 B2 * 11/2005 Hollstrom et al. .......... 709/217
7,099,937 B1 * 8/2006 Ochiai et al. ............... 709/224
7,124,177 B2 * 10/2006 Watanabe ................... 709/223
7,209,250 B2 * 4/2007 Nakao ....................... 358/1.15
2003/0088642 A1 * 5/2003 Price et al. ................. 709/218

* cited by examiner

*Primary Examiner*—Andrew Caldwell
*Assistant Examiner*—Douglas Blair

(57) ABSTRACT

A method is provided for controlling the operation of a peripheral device having a control panel. The method includes the steps of requesting a description of the control panel via a first client and configuring the control panel to send a message to a second client.

29 Claims, 7 Drawing Sheets

METHOD AND SYSTEM FOR CONTROLLING THE OPERATION OF A PERIPHERAL DEVICE IN A NETWORK

BACKGROUND OF THE INVENTION

The field of the invention generally relates to a method and system for controlling the operation of a peripheral device in a network.

In the personal computer environment, a peripheral device, such as a scanner or printer, is connected to a personal computer ("PC") located near the peripheral device via a parallel or USB port of that computer. When the peripheral device is connected to the PC, it is automatically recognized by the Microsoft Windows operating system (by plug-and-play) on the PC and the appropriate driver(s) is installed to enable a user to operate the peripheral device. In the circumstance in which the peripheral device is not recognized or unable to operate without special software, additional software may be necessary. The software is usually provided by the manufacturer along with the peripheral device at no additional charge.

In operation of a scanner for example, a user will manually load the desired paper into the scanner, and the user would return to the personal computer to call-up the appropriate scanner software and initiate a scan. The length of time for the entire operation from loading to scanning is minimal, primarily because of the distance between the peripheral device and personal computer is quite small. However, in a network environment in which possibly several hundred peripheral devices are located a great distance from a client site, time and hence aggravation become a factor. However, at present there is no simple way to improve the situation.

SUMMARY OF THE INVENTION

In an exemplary embodiment of the invention, a method of controlling the operation of a peripheral device coupled to a network, comprising the steps of remotely reprogramming a control panel of the peripheral device to send a message to a first client coupled to the network.

In yet another exemplary embodiment of the invention, a method of controlling the operation of a peripheral device having a control panel, the method comprising the steps of: requesting a description of the control panel from a first client; and configuring the control panel to send a message to a second client.

In another exemplary embodiment, a method of remotely controlling a peripheral device coupled to computer via a network, comprising the steps of: connecting the peripheral device to the network; automatically sensing the presence of the peripheral device; and enabling a user to remotely configure a control panel on the peripheral device to send a message to a client coupled to the peripheral device via the network.

In yet another exemplary embodiment, a computer system comprising: a network; a client and a peripheral device connected thereto via the network, the peripheral device having a control panel: software installed on the system including a method of controlling the operation of a peripheral device, the method comprising the steps of: requesting a description of the control panel from a first client; and configuring the control panel to send a message to a second client.

In another exemplary embodiment, a method of remotely controlling a peripheral device coupled to a client via a network, the client including a monitor, the method comprising the steps of: generating a control panel to enable a user to interact and control the operation of the peripheral device; and displaying the control panel on the monitor.

BRIEF DESCRIPTION OF THE DRAWINGS

The accompanying drawings, which are incorporated herein and constitute a part of the specification, illustrate a presently preferred embodiment of the invention, and together with the general description given above and the detailed description of the preferred embodiment given below, serve to explain the principals of the invention.

DESCRIPTION OF THE PREFERRED EMBODIMENT

Figure 1:
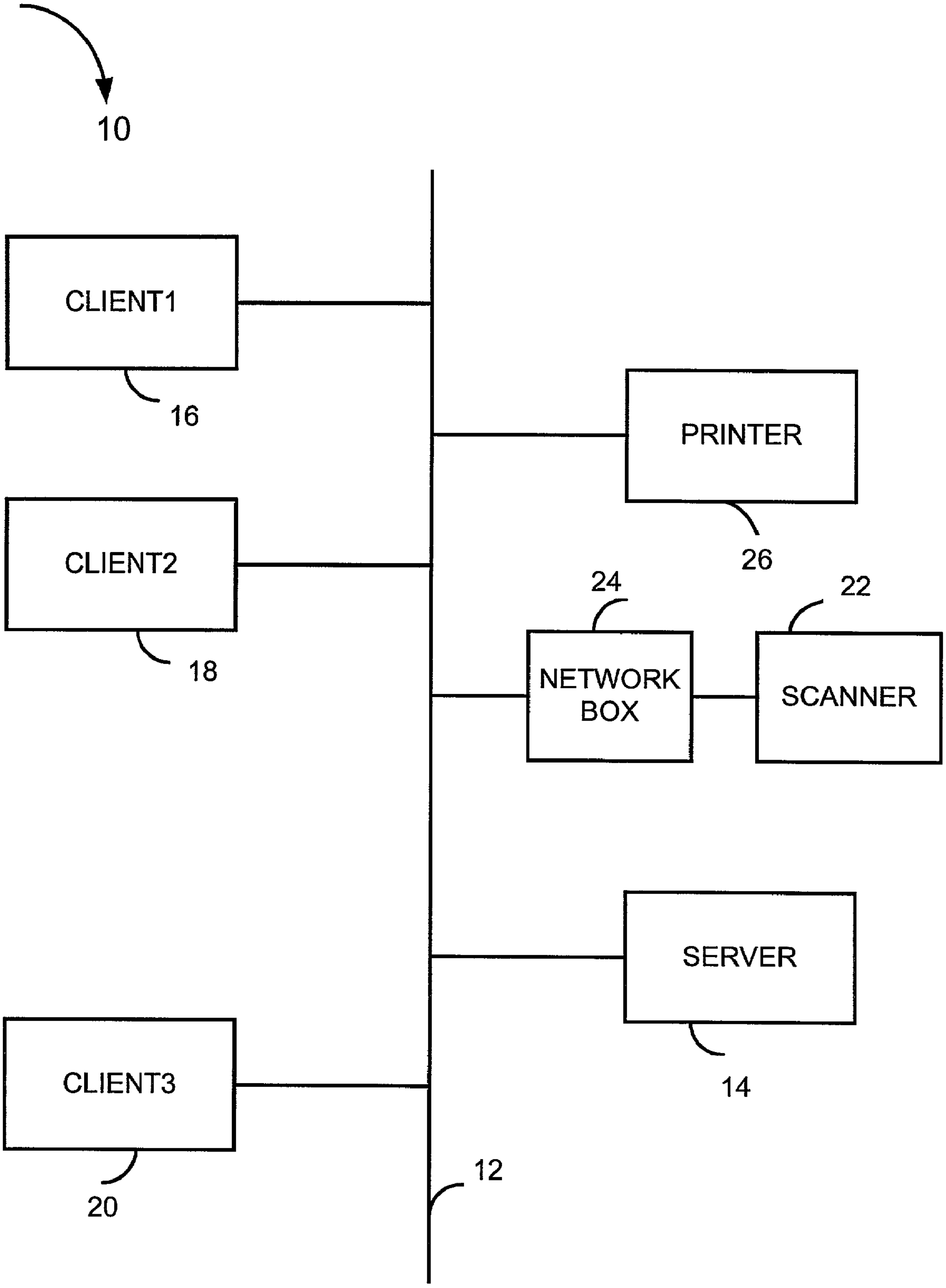
FIG. 1 is a block diagram illustrating a system of components incorporating the preferred embodiment of the present invention.

Referring to FIG. 1, there is shown a computer system 10 in which a server-based LAN 12 is connected to a server 14 for storing application software and files and routing shared information to several clients 16,18,20. The server includes the customary components of a computer including a CPU, a network or communications interface, RAM or ROM or other memory, as well as suitable storage devices such as disk or CD-ROM drives. A server based LAN is preferred, but other LANs may be employed for achieving communication between the clients, such as a peer-to-peer network. The most common software choices today seeking a server based LAN is some variant of Unix, Microsoft Windows 2000 or NT or XP, or Novell Netware. Microsoft Windows 2000 or Windows XP however are the preferred operating systems for server 14 and clients 16,18,20. However, the invention described herein it not limited to these operating systems. The invention may be applied to other operating systems which are currently marketed and those operating systems which are expected to be marketed. Each client site 16,18,20 includes a personal computer and a monitor. However, the client sites could be cellular telephones, PDAs, or even appliances equipped with browsers and networking. Network 12 can be an Ethernet or Token Ring network, but it can also be a telephone line network or a wireless network, using the IEEE 802.11b or Bluetooth or other wireless network protocol.

More generally, a client can be a PC, telephone, PDA, appliance, etc. equipped with an industry-standard (HTTP, FTP, WAP, HTML, XML, WML, cHTML, HDML, etc.) browser having wired (Ethernet, Token Ring, etc.) or wireless (cellular, Bluetooth, IEEE 802.11b, etc.) access via networking (UPnP, TCP/IP, Novell, NetBUI, Appletalk, etc.) to nearby and/or remote peripherals, devices, appliances, etc. The preferred embodiment will focus upon a device that utilizes the TCP/IP (transfer control protocol/Internet protocol) for communication between peers or between clients or between clients and servers, each client device having an internal TCP/IP/hardware protocol stack, where the "hardware" portion of the protocol stack could be Ethernet, Token Ring, Bluetooth, IEEE 802.11b, or whatever software protocol is needed to facilitate the transfer of IP packets over a local area network.

For purposes of communication between clients, it is presumed that some mechanism is provided for assigning IP addresses to each client and to the server. For example, server 14 could function as a DHCP server, assigning IP addresses to each of the clients, printers, scanners, etc. whenever they become active and join the local network 12. Alternatively, each device might have a permanently-assigned IP address. Or, in a peer-to-peer network, some other arrangement may be used whereby the peers may assign themselves addresses and identify themselves, as in a Bluetooth wireless network.

Returning now to FIG. 1, system 10 also includes scanner 22 and external network box 24 for enabling scanner 22 to communicate with network 12. Network box 24 includes conventional parts such as a microprocessor, ASICs, software and other components. Network box 24 is also a conventional component which may be purchased off shelf. An example of this is the Jet Direct EX170B, manufactured and sold by Hewlett-Packard. Alternatively, the network hardware and software, or a wireless network chip, or both may be built into the scanner. Additional "installation" software may be required to enable clients 16,18,20 to recognize scanner 22 and to install the appropriate drivers. This installation software is typically provided as a bundled product with other components or may be obtained from a manufacturer's web site. The installation software sold by Hewlett Packard under the name Jet Admin is an example of such designed to install printer drivers on PCs. Jet Admin is bundled with other Hewlett Packard Products or may be downloaded from its Hewlett Packard's web site www.hp.com.

Jet Admin, in a TCP/IP/Ethernet (optionally including the IEEE 802.11b wireless networking protocol) environment, hunts for all supported appliances on the network, such as the printer 26 and the scanner 22 and network box 24 and identifies the IP addresses of such appliances, as well as permits the alteration of the network IP addresses assigned to such appliances. It also permits a client to display lists of such appliances and enables a user to access them. It is contemplated that a program similar to Jet Admin could be used to locate all such appliances and to create browser icons or browsable directories listing all such appliances that would enable a user of a client, at the click of a mouse on an icon or list, to send to such an appliance a request for a browser page that would be a description of a peripheral device front or control panel.

A similar arrangement can be used for printer 26. However, a conventional printer networking card offers the same basic functionality as network box 24. That is, the printer networking card allows printer 26 to communicate with clients 16,18,20 or server 14 via network 12. This printer networking card is installed inside printer 26. The card may be purchased separately or as a bundled product with the installation printer software described above. That same installation software enables clients 16,18,20 to recognize printer 26 and install the appropriate driver. Note that the installation software is preferably installed on server 14 but may also be installed on client sites 16,18,20.

In the environment described, the "installation" software is used to enable a user to access either scanner 22 or printer 26 directly from client sites 16,18,20. The reason for this is that, at present, there is currently no software operating system (Windows 2000, Windows NT or Windows 98) capable of automatically discovering peripheral devices on the network and performing dynamic creation of an icon to access the peripheral device. There is however a newly evolving industry standard known as "Universal Plug and Play" ("UPnP") that accomplishes this task. UPnP has been created to enable easy and robust connectivity among stand-alone devices, PCs and other browser equipped devices obtainable from many different vendors. Universal Plug and Play is an architecture for peer-to-peer or server based network connectivity of PCs of all form factors, intelligent appliances, and wireless devices. UPnP is a distributed, open networking architecture that leverages TCP/IP and the Web to enable seamless proximity networking in addition to control and data transfer among networked devices in the home, office, and everywhere in between. (Windows XP supports UPnP for the dynamic creation of an icon to access any peripheral device.) The present invention will easily work with those operating systems which fully incorporate UPnP, once it is fully developed.

Operation of the system 10 is discussed below with respect to FIGS. 4 and 5.

Figure 2A:
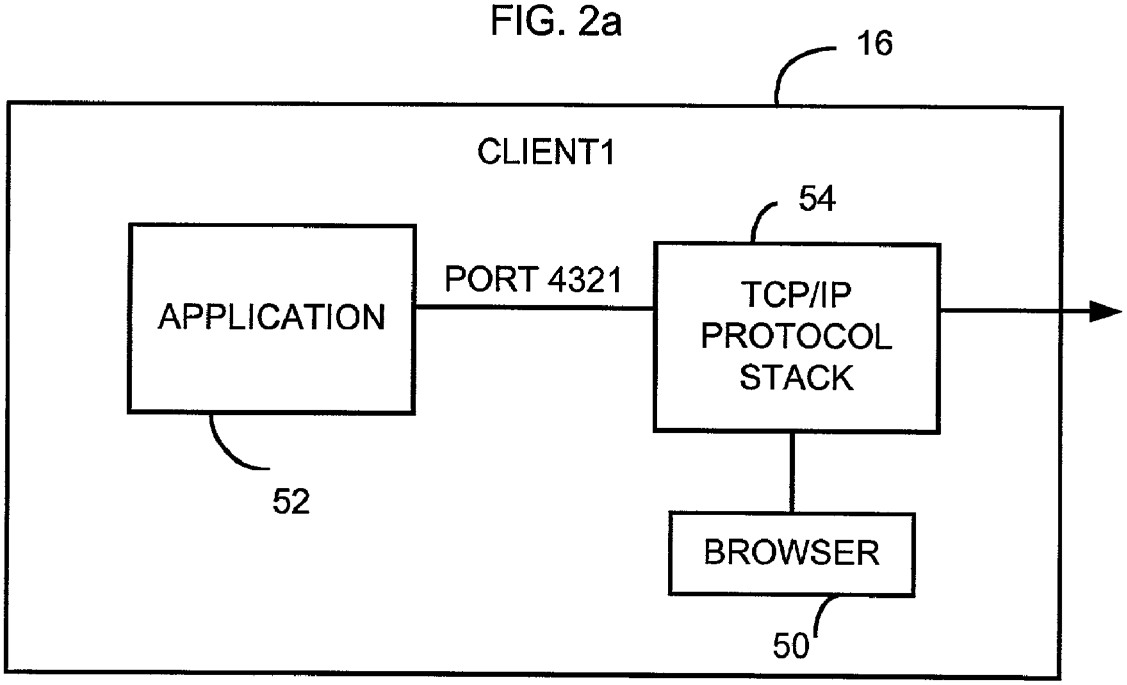
FIG. 2*a* is an enlarged view of client1 site shown in FIG. 1 illustrating internal components.

Referring to FIG. 2*a*, there is shown an enlarged block diagram of client 16 (client 1). Each client site however appears similarly. As indicated above, client 16 includes a personal computer and a monitor. (However, the client may be other browser equipped devices as described above.) The computer includes the customary components including a CPU, a network card or other communications interface, computer readable storage mediums, such as RAM or ROM or other memory, as well as storage devices such as disk or CD-ROM drives. The monitor may be any conventional off the shelf monitor. The preferred operating system is Windows 2000 or XP. Within each personal computer, an internet browser 50 such as Netscape or Internet Explorer is stored and used to display a description of the control panel of the peripheral devices, such as scanner 22 or printer 26, as set forth in the XML document transmitted to a client. Browser 50 is linked to network 12 via TCP/IP protocol stack 54.

In brief, in order to configure the elements of the front or control panel (such as the buttons, displays and LEDs) of a peripheral device, a user or IT administrator may call for a description of the elements of the control panel of scanner 22. Such a description is contained in an XML document stored in scanner 22 (discussed below). In order to call the XML document, an "HTTP" command is used along with the assigned IP address for scanner 22. The "HTTP" request is addressed, by the user's browser, to TCP port 80, within a peripheral device, this being the standard port address used for all requests for web pages on web servers world-wide (e.g., http://35.67.123.24). Accordingly, browser 50 receives the XML document and utilizes a parser program to construct the page and transform the XML into HTML format for display and viewing. This will be discussed in more detail below. Also stored in the computer is an application 52 which is directly linked to TCP/IP protocol stack 54 via TCP port 4321.

Application 52 is typically the program used to initiate a command to perform an operation on scanner 22. For example, the application may be programmed to execute a scan operation on scanner 22. That is, application 52 (FIG. 2*a*) receives a message, which identifies the Blue Button press, from scanner 22 on TCP port 4321. In response, application 52 executes a scan operation.

Figure 2B:
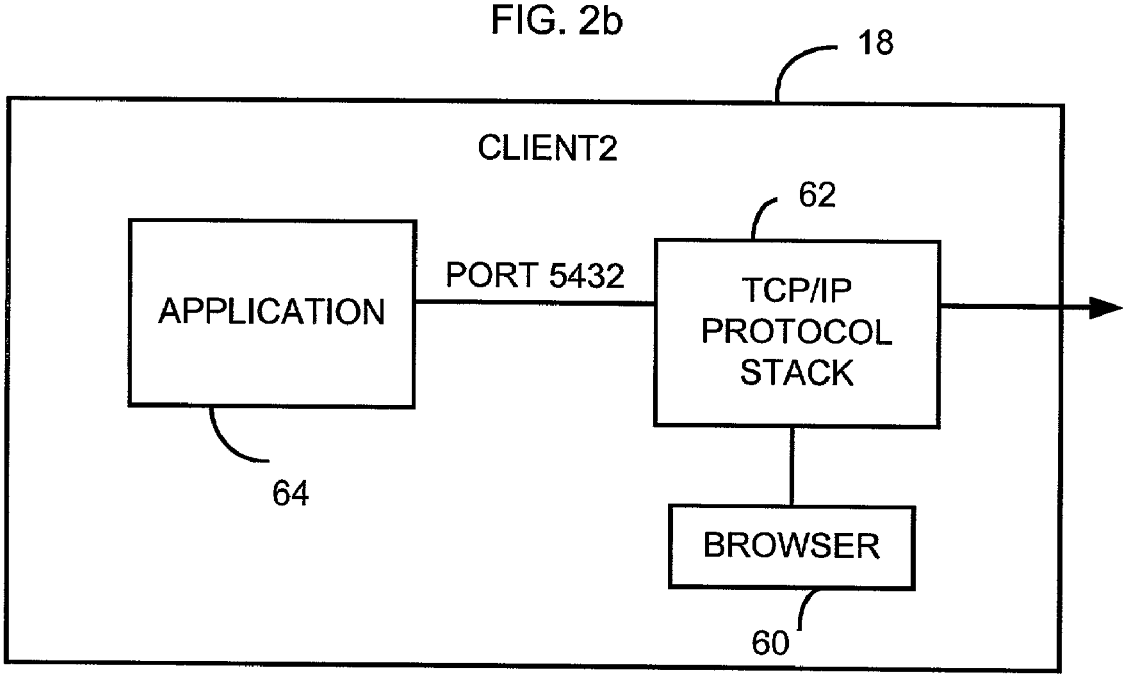
FIG. 2*b* is an enlarged view of client2 site shown in FIG. 1 illustrating internal components.

Referring to FIG. 2*b,* client 18 (client2) includes similar components as client 16 (client1). Client 18 includes a web browser 60, linked to network 12 through TCP/IP protocol stack 62. For example, application 64 receives a message, which identifies the Blue Button press, from scanner 22 on TCP port 5432. In response, application 64 executes a scan operation.

Figure 3:
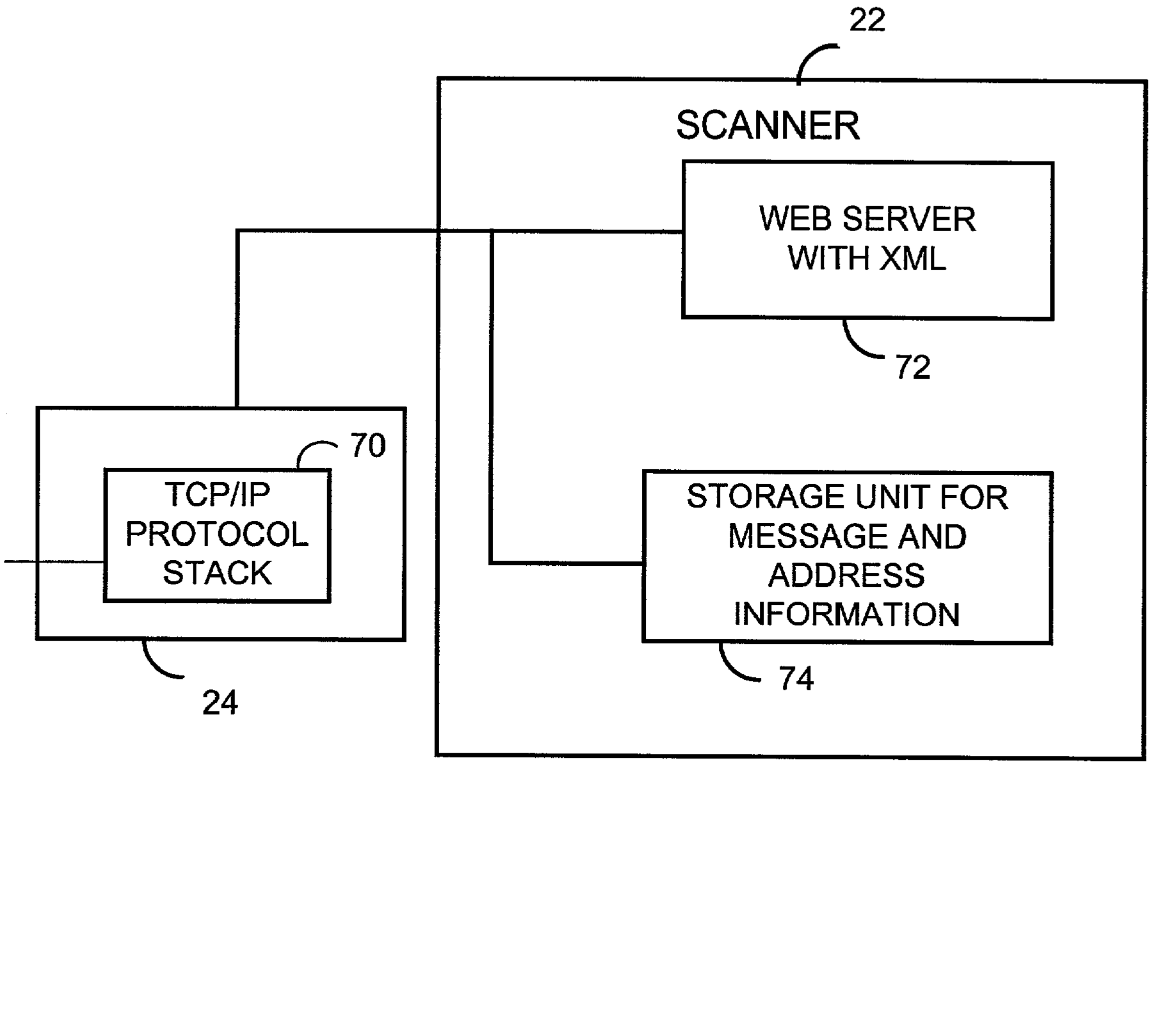
FIG. 3 is an enlarged view of the scanner shown in FIG. 1 illustrating internal components.

Referring to FIG. 3, there is shown some of the internal components of network box 24 and scanner 22. Scanner 22 has several conventional components (e.g., drum, motors, etc.) that are not shown in FIG. 3. Network box 24 includes TCP/IP protocol stack/hardware (Ethernet, IEEE 802.11b, Bluetooth, or whatever) stack 70 that is linked to hardware (not shown—an Ethernet connector or radio transceiver, for example). Scanner 22 includes application web server 72, wherein an XML page or document of the control panel description (of scanner 22) is stored. Scanner 22 also includes a storage unit 74 for storing message and address information sent along with the SOAP command (discussed below). Network box 24 is connected to scanner 22. The message and address information are stored for later insertion into the XML document when requested by a user.

Figure 4:
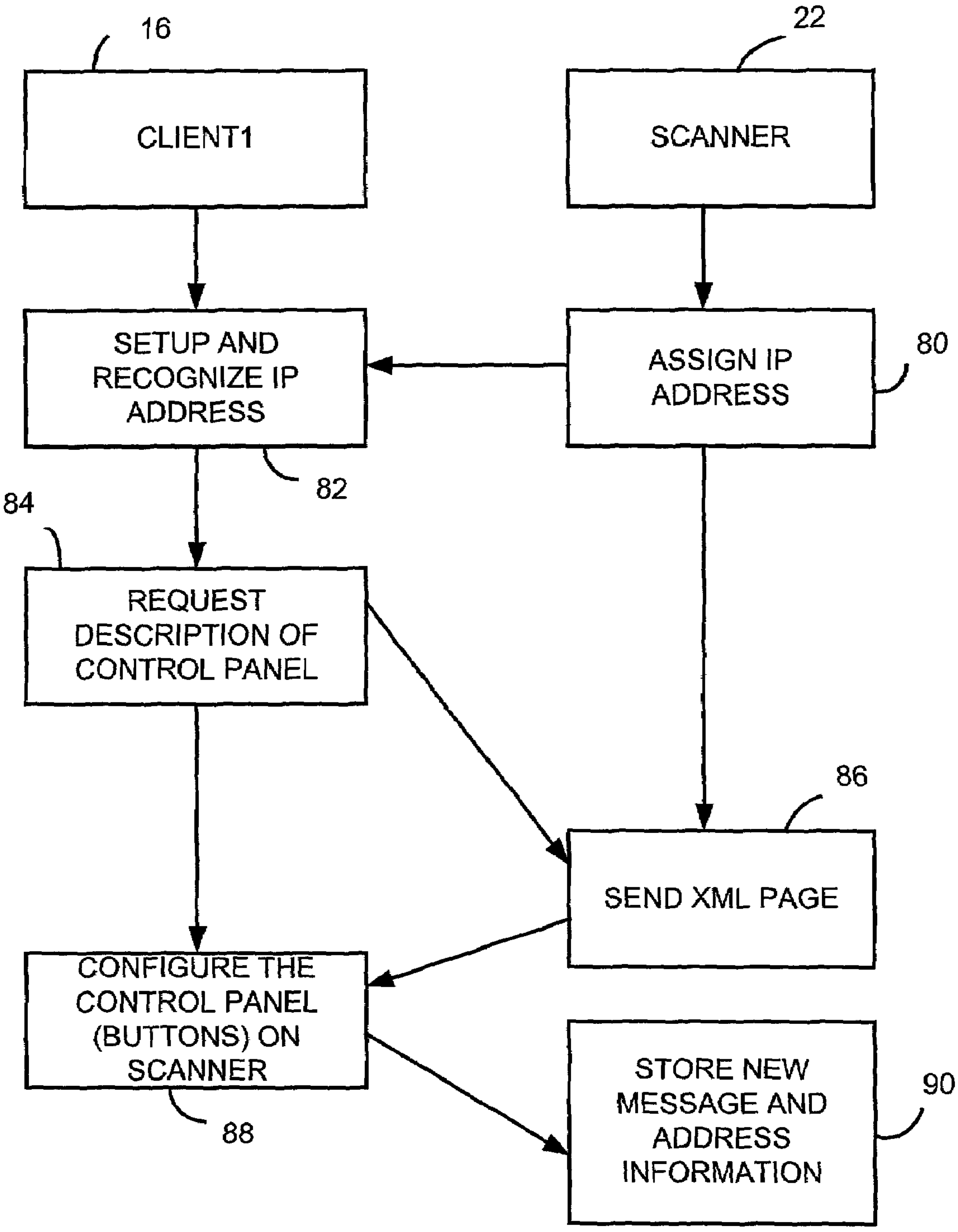
FIG. 4 is a dual flow diagram illustrating the operation of the system shown in FIG. 1 and the configuration of the control panel of a peripheral device in accordance with the preferred embodiment of the present invention.
Figure 5:
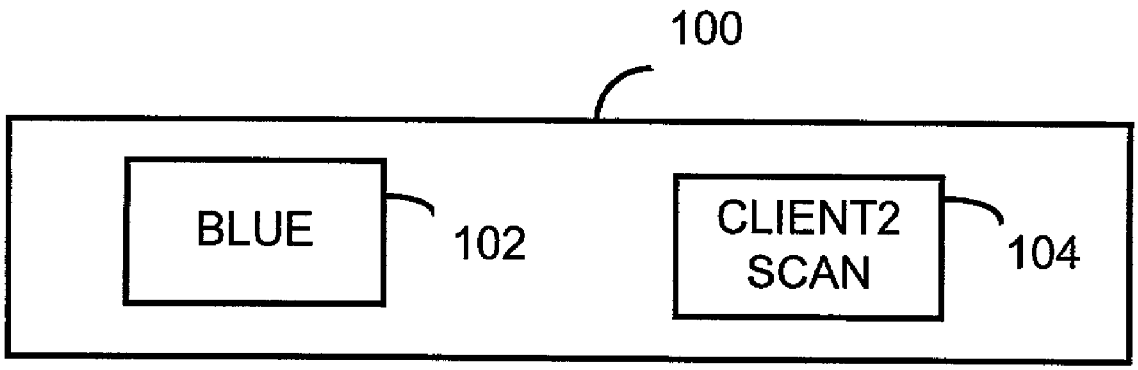
FIG. 5 is an illustration of a two button control panel for configuration.

Referring to FIG. 4, there is shown a flow diagram of the system 10 in a dual configuration. In this configuration, it is presumed that the necessary installation software described above has been installed on server 14 and/or clients 16,18, 20. Now, scanner 22 is connected to network 12 and is assigned an IP address at block 80, for example, by the DHCP facility of server 14 or by some other comparable mechanism, or the IP address may be manually assigned or contained in the scanner's ROM. Client 16 (client1) is then caused to find and to recognize the IP address assigned to scanner 22, at block 82, with an IP address directed to scanner 22 connected to network 12. These steps could be handled by UPnP if it is available. Note that scanner 22, like printer 26, includes a web server 72, so that when an HTTP request for the control panel description is made to the IP address assigned to scanner 22, at step 84, scanner 22 can respond (at step 86 below) with an XML page of the description of the elements of the control panel.

Now, if the user or IT administrator at client 16 or any other site for example, requests for a description of the control panel of the scanner 22 (via an HTTP request), at block 84, an XML page or document at step 86 is sent to client site 16. A typical XML page may resemble that shown in Appendix A. The details of the configuration are discussed below. Suffice it to say, browser 50 uses a parser program to construct the page for viewing. The parser program incorporates an XML style sheet language program ("XSL") that is used to transform the XML document into an HTML format for viewing via browser 50. Browser 50 uses a Document Object Module ("DOM") which is an industry standard interface for programming with XML parsers. DOM is incorporated into the XML parser. DOM is used as a way to load and control the parser to perform the transformation from XML to HTML. The parser program may be found and downloaded from the Microsoft web site (msdn.microsoft.com). As a result of the transformation, a representation of a control panel will be displayed on a monitor via browser 50. A two button control panel will be displayed on a monitor in accordance with the XML document set forth in Appendix A. FIG. 5 is an illustration of that two button control panel 100.

Now returning to execution step 88, the user or IT administrator may configure the elements of control panel 100 to send a message to an address. In the preferred embodiment, as previously described and as shown FIG. 5, control panel 100 includes two elements (i.e., blue button 102 and green button 104) on scanner 22, but control panel 100 may have any combination of elements, such as buttons, displays elements, LEDS or list elements of message commands. (Buttons are control panel elements that can be configured to do one thing.) Each time a button is pressed, the configured action is executed. A display is a control panel element that can show a caption. The value shown on the display can be set directly, or it may be set by an internal action such as stepping through a list. Displays cannot have actions. An attempt to set the configuration of a display element will only change the caption of the element. An LED is a simple display element. It has two values: true (1) or false (0). The value shown can be set directly or by an internal action. LEDs have no actions. A list is control panel element that can have multiple configurations. Each configuration contained within a list has its own ID and a name that is a concatenation of the list name and an item specific part (list.item.) Setting a configuration on list item will add it to the list.) The details of configuration will be discussed below.

The configuration changes to control panel 100 are sent to scanner 22 using a simple object access protocol (SOAP) request. A SOAP request may resemble the message shown in Appendix B (A SOAP response is also shown). SOAP is a programming tool for developers. It is publicly available and can be found on the internet at http://www.w3.org/TR/SOAP/. The SOAP message is embedded in HTTP request. The contents of the SOAP message, i.e., the message information for the element of the control panel and the address for the message are stored in a conventional component such as RAM in scanner 22, at step 90. This message is sent to the address stored when an element (button) on control panel 100 is pressed by the user. This is discussed below.

Configuration or reprogramming of the control panel is now discussed. When a description of the control panel (scanner 22) is requested (using "HTTP"), the description of the control panel is sent in the form of an XML page stored in scanner 22. The description sent by scanner 22 may resemble the XML document shown in Appendix A. As seen in Appendix A, the blue button has not been configured. The green button however has been configured and assigned to another client (client2). As described above, note that the XML document will be transformed into an HTML page for display via a browser. Control panel 100 shown in FIG. 5 is a representation of the description of that the transformed XML page in Appendix A.

Figure 6:
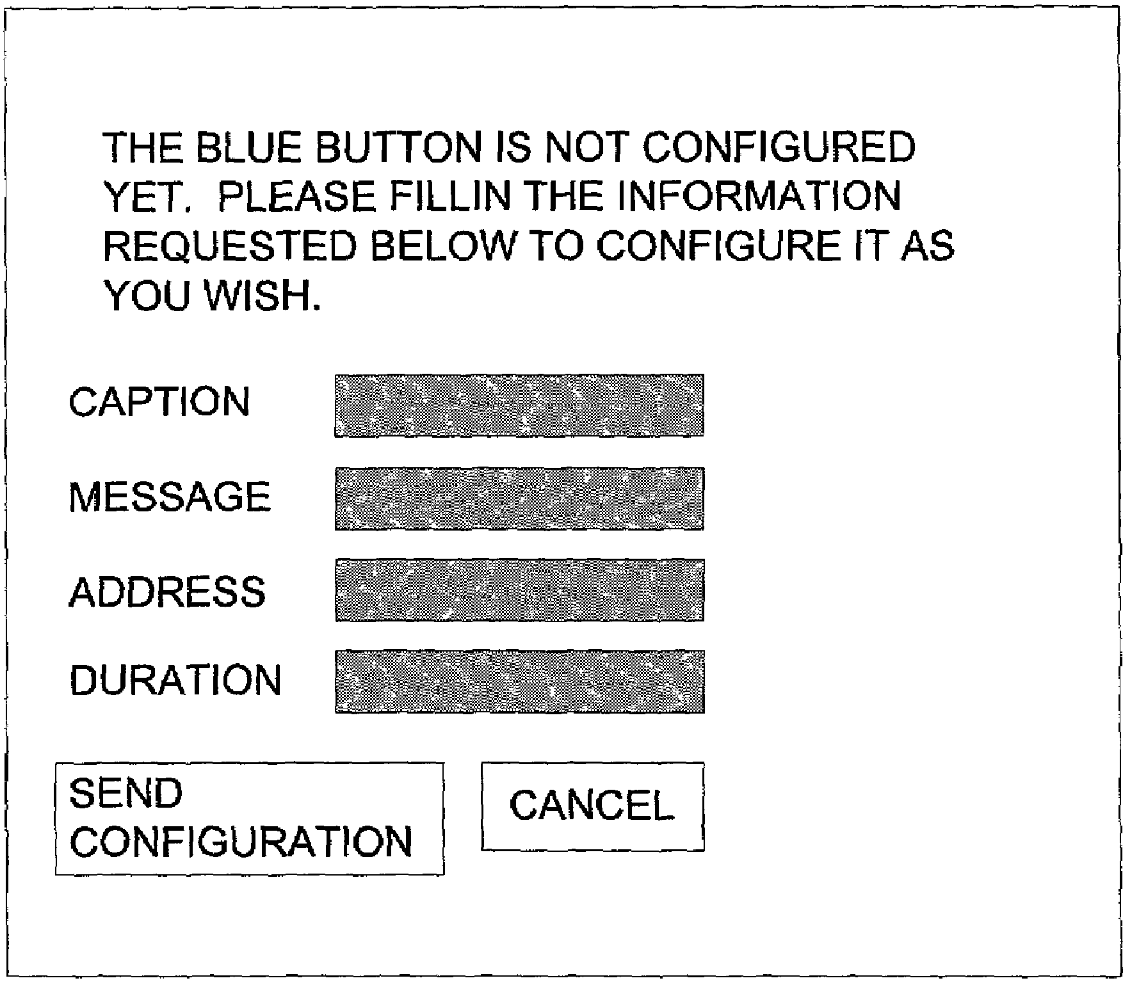
FIG. 6 is an illustration of a box display for entering information to configure a control panel button.

If the present client1 (user or administrator) wishes to use scanner 22, he/she must configure the button for its use. In this case, blue button 102 must be configured. Button 104 is already configured to scan by client2. In order to configure blue button 102, the user would click on blue button 102 and a box display will appear in the browser for entering configuration information. This box display may be generated by the browser using a Java Script embedded in a web page, preferably on the peripheral device. Any simple box may be created and used for entering configuration information. An example of such a box display is shown in FIG. 6. The box display is generated using the Java Script shown in Appendix D. As seen in FIG. 6, a user or administrator is advised that blue button 102 is not configured and asked to enter information to configure blue button 102. Such information includes a caption, message, address and duration.

The user or administrator may configure blue button 102 to send a message "Blue Scan Button Pressed" to itself at TCP port 4321 (arbitrarily chosen). The caption may be set to "Blue Button" and the duration may be set for 1 hour (3600 seconds.) These parameters may be entered into the box display shown in FIG. 6. Once the information is entered, the user or administrator would click on the "Send Configuration" box to execute a SOAP request. As described above, the SOAP request is sent to scanner 22 and it resembles the message shown in Appendix B. The SOAP request is a function call from client 16 (client1) to scanner 22. In this case, the function is the SetConfiguration function which is described as "SetConfiguration(name, message, address, caption, duration)" where "name" is the name of the button, "message" is the message that will be sent to application 50, "address" indicates where application 50 will be listening for the message, "caption" is the text that should appear on the button in the control panel representation, and "duration" is the maximum time that can elapse until the button settings expire.

In the preferred embodiment described, "Blue Button Pressed" is the message part of the action. "Blue Button" is the caption that will be displayed on the button. "client1: 4321" is the address that the action should be sent. It is presumed that the client application will be listening at that address for the message that the button has been pressed. "3600" is the duration (in seconds) for the configuration. That is, after 3600 seconds has elapsed, the configuration will be reset to the default values, unless the configuration is renewed. After the SOAP request is sent, the message information for the elements of control panel 100 and the address for the message in the SOAP request are stored for later use in storage unit 74, which includes an internal RAM or EEPROM data structure. The modified description of the XML page will appear like the XML page shown in Appendix C.

Sometime before the blue button configuration expires (before 1 hour has passed), a user physically presses the blue button on scanner 22. When this happens, a microprocessor in scanner 22 executes a command to send the message "Blue Scan Button Pressed" stored in storage unit 74 to client 16 (client1) at the TCP port 4321, where an application is listening for the message. The application on client1 initiates a scan based on the message received. This operation is set forth in the flow diagram of FIG. 7. When a user presses a button, e.g., blue button, on scanner 22 (at step 110), the message "Blue Scan Button Pressed" is sent, at step 112, to the designated address (client1 at IP port 4321) using the message and address information stored in storage unit 74 of scanner 22. At execution step 114, application 52 on the client site 16 (client1) receives the message and executes a scan based on the message received.

When all the applications are done with scanner 22, the configurations may be permitted to expire or may be released or deleted, whichever is desired. This may be accomplished using another SOAP request such as "UnsetConfiguration." This may be described as "UnsetConfiguration (name)" where "name" is the name of the button. This request would reset all of the associated data for the named button back to the default (inactive) values. This action is implemented by the application (listening for message information) when it terminates.

Appendix E illustrates another example of a description document (XML). This document describes a three button (NextItem, PreviousItem, Select) scanner with one display. The NextItem and PreviousItem buttons would scroll through the items in a list of items. Each item would show its caption on the display in turn. When the Select button is pressed, the selected action would be executed. Note that there are currently 4 list items listed. The number of items would vary depending upon the actual number of items at the time the description document was read. The control panel buttons are not actually configurable, so they would not appear in the remote access description. However, if they did, they would appear similar to the description shown in Appendix F.

Figure 7:
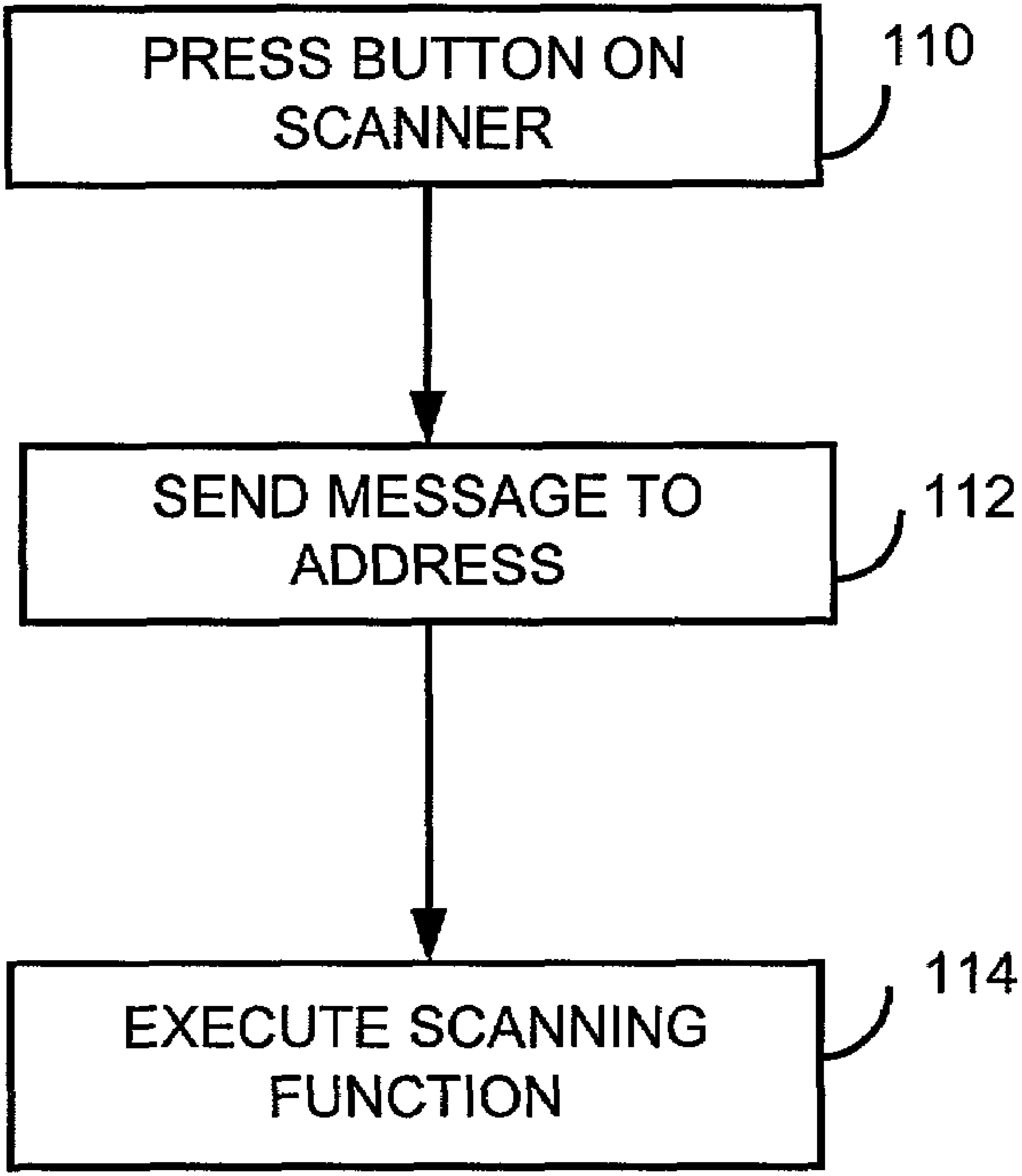
FIG. 7 is a flow diagram illustrating an implementation of the system in FIG. 1 after configuration.

It is important to note that some peripheral devices may be designed without a front control panel. In this embodiment, also in accordance with the present invention, a user may activate the peripheral device, such as a scanner, from a client site itself in the network. Once the control panel is remotely configured as described above, a user may access a remote control panel and display such panel on a monitor. This preferably may be achieved using a browser. As described above, a two button control panel is shown in FIG. 7. Similar to that process occurring when a user presses a button on the scanner itself, if the user clicks the blue button using a mouse for example, the scanner sends the message "Blue Scan Button Pressed" to client1 at the TCP port 4321, where the application on client site is listening for the message. The application on client1 then initiates a scan based on the message received.

In an environment utilizing UPnP, the entire process would be automated. In this regard, the peripheral device would be recognized after installation, an IP address would be assigned, and an icon would be installed on a client site (with a URL) to enable the user to access the peripheral device by clicking on the icon. The peripheral device would include a web server with the appropriate XML document. The peripheral device would also include Java Script or other means to decode the XML document to enable the user to view the button display. An input form would appear when a user presses a button that has not been configured. The user would enter information, such as the caption, name, action and duration for the action of the button. This information would be sent (by way of UPnP commands) and stored in the peripheral device. Once the information has been entered and stored in the peripheral device, the user would click a button to implement an action on the scanner.

The foregoing description of a preferred embodiment of the invention has been presented for purposes of illustration and description. It is not intended to be exhaustive or to limit the invention to the precise form disclosed and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and their equivalents.

APPENDIX A

```
<?xml version'1.0'?>
<elementList>
    <button>
        <name>blue</name>
        <action>
            <callback> </callback>
              <message> </message>
        </action>
          <caption>B/ue</caption>
        <duration> 5000</duration>
```

APPENDIX A-continued

```
            </button>
            <button>
                  <name>green</name>
                  <action>
                        <callback>Client2:5432</callback>
                      <message>Scan to Client2</message>
                    </action>
                  <caption> Client2 Scan </caption>
                  <duration>5000</duration>
              </button>
        </elementList>
```

APPENDIX B

```
SOAP REQUEST
POST ServiceURL HTTP/1.1
HOST: Scanner22
CONTENT-LENGTH: 392
CONTENT-TYPE: text/xml; charset-"UTF-8"
SOAPACTION:"urn:schemas-acme-com:service:frontpanel:
1#SetConfiguration"
<s:Envelope
      xmlns:s-http://schemas.xmlsoap.org/soap/envelop
      s:encodingStyle "http://schemas.xmlsoap.org/soap/encoding/>
        <s:Body>
            <U:SetConfiguration xmlus:u "urn:scgenas-acme-
com:service:frontpanel:1">
                  <name>Blue</name>
                  <message>BlueScanButtonPressed</message>
                  <address>client1:4321</address>
                  <caption>BlueButton</caption>
                  <duration>3600</duration>
        </s.Body>
</sEnvelope>
SOAP RESPONSE
HTTP/1.1 200 OK
CONTENT-LENGTH:274
CONTENT-TYPE: text/xml:charset-"ulf-8"
DATE: 10October2001
EXT:
SERVER: Windows XP/v1.0UpnP/1.0 Scanner22/0.1
<s:Envelope
      xmlns:s "http://schemas.xmlsoap.org/soap/envelop"
      s:encodingStyle-"http://schemas.xmlsoap.org/soap/encoding/">
        <s.Body>
            <u:SetConfigurationResponse xmlns:u="urn:scgenas-acme-
                        com:service:frontpanel:1">
                  <1d>222</1d>
                  </u:SetConfigurationResponse>
        </s.Body>
</s:Envelope>
```

APPENDIX C

```
      <?xml version '1.0'?>
      <elementList>
            <button>
            <name>blue</name>
            <action>
                  <callback>Clientl:4321 </callback>
                  <message>Blue Scan Button Pressed </message>
            </action>
            <caption>Blue Button</caption>
            <duration>3600</duration>
      </button>
      <button>
            <name> green</name>
            <action>
                  <callback>Client2:5432</callback>
                  <message>Scan to Client2 </message>
            <action>
            <caption> Client2 Scan </caption>
            <duration> 5000</duration>
              </button>
      </elementList>
```

APPENDIX D

```
<HTML>
  <HEAD>
      <TITLE>Two Button Scanner Example</TITLE>
      <SCRIPT LANGUAGE=javascript>
      <!-- All scripts are in comments so that old browsers won't break
      // Constant values
      var DefaultDuration = 7200;    // Seconds (2 hours)
      var ActionIdx = 0;             // We will always use element 0 for
                                     simplicity
      // Global Element Arrays
      var gElementCount = 0
      var gElementName(15)           // Save room for fifteen (15) elements
      var gElementCaption(15)  //
      var gElementAction(15)   //
      var gElementID(15)       //
      var gURLScanner                    // Once we find the scanner,
                                         save the URL
      // This function is called once when the page is loaded
      // It sets up our button and the page that represents the front panel
      function window__onload( )
      {
            dim vFrontPanel
            // First, find the scanner. The actual method is beyond the scope
            // of the invention discussed here
            gURLScanner = discoverScannerURL( )
            // Now, parse the description document from the scanner to fill
            // the element arrays
            parseDescription( gURLScanner)
            // Now, lets program the first button with default caption and
            action
            gElementAction[ActionIdx] = "handleScanAction";
            gElementCaption[ActionIdx] = "Scan to Me!";
            gElementID[ActionIdx] = soapSetConfiguration(
                                         gURLScanner,
                  // the URL of the scanner
                                         gElementName[ActionIdx],
      // the name of the button
                                         gElementAction[ActionIdx],
      // the function to execute later
                                         getHandlerURL( ),
            // unspecified method to get our URL
                                               gElementCaption[ActionIdx],
      // The caption on our button
                                         DefaultDuration );
            // finally, build a bunch of elements in the page
            // First, the form
            vFrontPanel = " <FORM name ='frmFrontPanel'>";
            // Build a button for each element
            // For simplicity, assume that each element is a button
            for ( idx=0; idx < gElementCount; idx++ )
            {
                  // For each button create an HTML button
   innerHTML += "<INPUT type='button'
   LANGUAGE=javascript ";
   innerHTML +=
   "onclick ='btn__onclick("+gElementAction[idx]+")'";
   innerHTML +="value ="' + gElementCaption[idx] + "'";
   innerHTML += "id=btn" + gElementName[idx] + ">";
            }
            // Close the form
            vFrontPanel = "</FORM>";
            // Put this stuff in the page
            divFrontPanel.innerHTML = vFrontPanel;
      }
      // This function is called once before the page is unloaded
      // It just releases the configuration that we used
      function window__onunload( )
      {
            // Release our button
            soapDeleteConfiguration( gElementID[ActioniIdx] );
      }
      // This function is called whenever a button on the scanner is
      'pressed' function jsEventHandler( buttonName, actionName )
      {
            // In this simple case, we know that we are only handling the
            // element associated with ActionIdx. We could handle more and
            // use the buttonName value to search the gElementName array
```

APPENDIX D-continued

```
        // for a match For now, just use the ActionIdx value
        // Use the actionName value as a function pointer and call the
        function actionName gURLScanner, buttonName, ActionIdx
    }
    function parseDescription( URLDescription )
    {
        // I am going to omit this detail for now. It will take more time
        // than I have to do this. I would use an XML parser to parse the
        // individual "Button" (and other types of elements) elements
        // to get the information that we need and put it into the
        // gElementXXX arrays declared at the beginning of the script
        section
    }
    // This is the handler function for our button press. It is setup as the
    // action value and called by name in the jsEventHandler function
    function handleScanAction(URLScanner, buttonName, Index)
    {
        // Do something here to perform the scan. This is way beyond
the scope
        // of the invention to specify here.
    }
    -->
    </SCRIPT>
  </HEAD>
  <BODY LANGUAGE=JavaScript onload='window__onload( )'
onunload='window__onunload( )'>
    <DIV id=divFrontPanel></DIV>
  </BODY>
</HTML>
```

APPENDIX E

```
<?xml version='1.0'?>
<elementList>
  <list>
    <name>Scan Clients </name>
    <itemList>
      <item>
        <name>Scan Clients.Client1</name>
        <callback>client1:4244</callback>
        <message >Execute Scan on Scanner1</message>
        <caption>Client1</caption>
        <duration>345</duration>
      </item>
      <item>
        <name>ScanClients.Client2</name>
        <callback>client2:4244</callback>
        <message>Execute Scan on Scanner1</message>
        <caption>Client2</caption>
        <duration>456</duration>
      </item>
      <item>
        <name>Scan Clients.Client3</name>
        <callback>client3.4244</callback>
        <message>Execute Scan on Scanner1</message>
        <caption>Client3</caption>
        <duration>123</duration>
      </item>
      <item>
        <name>ScanClients.Client4</name>
        <callback>client4:4244</callback>
        <message>Execute Scan on Scanner1</message>
        <caption>Client4</caption>
        <duration>3600</duration>
      </item>
    </itemList>
  </list>
  <display>
    <name>ScanMenu</name>
    <characters>20</characters>
    <rows>1</rows>
    <caption>Press Next or Prev</caption>
  </display>
</elementList>
```

APPENDIX F

```
<button>
    <name>NextItem</name>
    <action>
        <internal>NextListElement</internal>
        <target>ScanClients</target>
    </action>
    <caption>Next</caption>
</button>
<button>
    <name>PreviousItem</name>
    <action>
        < internal>PreviousListElement</internal>
        <target>ScanClients</target>
    </action>
    <caption>Previous</caption>
</button>
<button>
    <name>SelectItem</name>
    <action>
        <internal>ExecuteListElement</internal>
        <target>ScanClients</target>
    </action>
    <caption>Select</caption>
</button>
```

What is claimed is:

1. A method of controlling the operation of a peripheral device coupled to a network, comprising remotely reprogramming a control panel of the peripheral device to send a message to a first client coupled to the network, wherein the control panel of the peripheral device was previously programmed to send a message to a different client coupled to the network, the message intending to cause the first client to execute an operation associated with a subsequent control panel selection made on the peripheral device after the control panel is reprogrammed, a network address of the first client being stored internally by the peripheral device and the message identifying a control panel selection from a user of the peripheral device, wherein an application of the first client executes the operation on the peripheral device associated with the control panel selection in response to receiving the message.

2. The method of claim 1, wherein the reprogramming includes a step of requesting a description of the control panel.

3. The method of claim 1 wherein the reprogramming further includes a step of configuring the control panel.

4. The method of claim 1, wherein the reprogramming further includes a step of constructing a viewable control panel based on the description of the control panel.

5. The method of claim 1, wherein the reprogramming is requested via a second client different than the first client.

6. The method of claim 1, wherein the peripheral device is one of a scanner or a printer.

7. A method of controlling the operation of a peripheral device having a control panel, the method comprising the steps of:

via a first client, requesting a description of the control panel; and via the first client, configuring the control panel to send a message to a second client, a network address of the second client being stored internally by the peripheral device and the message identifying a control panel selection from a user of the peripheral device, wherein an application of the second client executes an operation on the peripheral device associated with the control panel selection in response to receiving the message.

8. The method of claim 7, further comprising a step of constructing a viewable control panel based on the description of the control panel.

9. The method of claim 7, wherein the control panel includes at least one element.

10. The method of claim 9, wherein the at least one element comprises a button.

11. The method of claim 9, wherein the at least one element comprises a display.

12. The method of claim 9, wherein the at least one element comprises an LED.

13. The method of claim 10, wherein the configuring step includes a step of redefining the button.

14. The method of claim 11, wherein the configuring step includes a step of redefining the display.

15. The method of claim 12, wherein the first client is different than the second client.

16. The method of claim 7, wherein the description of the control panel is in XML format.

17. The method of claim 7, wherein the peripheral device is one of a printer or a scanner.

18. A computer system comprising:

a network;

a client and a peripheral device connected thereto via the network, the peripheral device having a control panel; and software installed on the system for performing a method of controlling the operation of a peripheral device, the method comprising the steps of:

via a first client, requesting a description of the control panel; and via the first client, configuring the control panel to send a message to a second client, a network address of the second client being stored internally by the peripheral device and the message identifying a control panel selection from a user of the peripheral device, wherein an application of the second client executes an operation on the peripheral device associated with the control panel selection in response to receiving the message.

19. A program product for controlling the operation of a peripheral device coupled to a network, comprising a computer readable medium having machine-readable program code embodied therein to be executed by a computer for causing a machine to perform remote reprogramming of a control panel of the peripheral device to send a message to a first client coupled to the network, wherein the control panel of the peripheral device was previously programmed to send a message to a different client coupled to the network, the message intending to cause the first client to execute an operation associated with a subsequent control panel selection made on the peripheral device after the control panel is reprogrammed, a network address of the first client being stored internally by the peripheral device and the message identifying a selection of the control panel of the peripheral device, wherein an application of the first client executes the operation on the peripheral device associated with the selection in response to receiving the message.

20. The program product of claim 19, wherein the reprogramming includes a step of requesting a description of the control panel.

21. The program product of claim 20, wherein the reprogramming further includes a step of configuring the control panel.

22. The program product of claim 19, wherein the reprogramming further includes a step of constructing a viewable control panel based on the description of the control panel.

23. The program product of claim 19, wherein the step of reprogramming is carried out on a second client different than the first client.

24. The program product of claim 19 wherein the peripheral device is one of a scanner or a printer.

25. A computer readable medium having a machine-readable program code for controlling the operation of a peripheral device having a control panel, the program code embodied therein to be executed by a computer for causing a machine to perform the following method steps:

via a first client, requesting a description of the control panel; and via the first client, configuring the control panel to send a message to a second client, wherein the control panel of the peripheral device was previously programmed to send a message to a different client coupled to the network, the message intending to cause the first client to execute an operation associated with a subsequent control panel selection made on the peripheral device after the control panel is reprogrammed, a network address of the second client being stored internally by the peripheral device and the message identifying a control panel selection from a user of the peripheral device, wherein an application of the second client executes the operation on the peripheral device associated with the control panel selection in response to receiving the message.

26. The program product method of claim 25, further comprising code for causing the performance of a step of constructing a viewable control panel based on the description of the control panel.

27. The program product of claim 25, wherein the configuring step includes a step of redefining a button.

28. The program product of claim 25, wherein the configuring step includes a step of redefining a display.

29. A computer readable medium having machine readable program code for remotely controlling a peripheral device coupled to a computer via a network, the program code embodied therein to be executed by a computer, the program code performing the steps of:

automatically sensing the presence of a peripheral device on the network; and enabling a user to remotely configure a control panel on the peripheral device to send a message to a client coupled to the peripheral device via the network by allowing a selection from the control panel to be assigned to a particular client on the network for a stated duration, such that an application of the particular client performs an operation on the peripheral device associated with the selection in response to receiving the message.

* * * * *

UNITED STATES PATENT AND TRADEMARK OFFICE

CERTIFICATE OF CORRECTION

PATENT NO. : 7,275,092 B2
APPLICATION NO. : 10/012508
DATED : September 25, 2007
INVENTOR(S) : Larry A. Copp It is certified that error appears in the above-identified patent and that said Letters Patent is hereby corrected as shown below:

In column 9, under “Appendix B”, line 19, delete “</s.Body>” and insert -- </s:Body> --, therefor.

In column 9, under “Appendix B”, line 31, delete “<s.Body>” and insert -- <s:Body> --, therefor.

In column 9, under “Appendix B”, line 36, delete “</s.Body>” and insert -- </s:Body> --, therefor.

In column 11, under “Appendix E”, line 22, delete “client3.4244” and insert -- client3:4244 --, therefor.

Signed and Sealed this

Twenty-fourth Day of June, 2008

JON W. DUDAS
*Director of the United States Patent and Trademark Office*